United States Patent
Cang et al.

(10) Patent No.: US 8,285,746 B2
(45) Date of Patent: Oct. 9, 2012

(54) SECURING DATA FROM A SHARED DEVICE

(75) Inventors: Song Sheng Cang, Flushing, NY (US); Jane Xiaohong Ding, White Plains, NY (US); Benjamin Gregory Grabkowitz, Holbrook, NY (US)

(73) Assignee: Canon U.S.A., Inc., Lake Success, NY (US)

( * ) Notice: Subject to any disclaimer, the term of this patent is extended or adjusted under 35 U.S.C. 154(b) by 408 days.

(21) Appl. No.: 12/424,346

(22) Filed: Apr. 15, 2009

(65) Prior Publication Data

US 2009/0313262 A1 Dec. 17, 2009

Related U.S. Application Data

(60) Provisional application No. 61/061,708, filed on Jun. 16, 2008.

(51) Int. Cl.
*G06F 17/00* (2006.01)
*G06F 17/30* (2006.01)
(52) U.S. Cl. .................... 707/781; 707/999.002
(58) Field of Classification Search .......... 345/156; 707/695, 701, 709, 781, 999.002, 999.006; 715/783
See application file for complete search history.

(56) References Cited

U.S. PATENT DOCUMENTS

| 6,678,682 | B1 * | 1/2004 | Jenkins et al. .................. 1/1 |
| 7,120,763 | B1 | 10/2006 | Schafer |
| 7,614,010 | B2 * | 11/2009 | Hosoki et al. ............... 715/783 |
| 7,636,079 | B2 * | 12/2009 | Wong ........................ 345/156 |
| 2004/0199763 | A1 | 10/2004 | Freund |
| 2005/0278543 | A1 * | 12/2005 | Tsuda et al. ................ 713/182 |
| 2007/0219917 | A1 * | 9/2007 | Liu et al. ..................... 705/59 |
| 2008/0215883 | A1 * | 9/2008 | Fok et al. ................... 713/167 |
| 2009/0288079 | A1 * | 11/2009 | Zuber et al. ................ 717/176 |

\* cited by examiner

*Primary Examiner* — Marc Filipczyk
(74) *Attorney, Agent, or Firm* — Canon U.S.A., Inc. IP Division

(57) ABSTRACT

A method for securing the use of data on a first device where the data is sent from a second device, the method including registering at least a first application on the first device, starting the at least first application on the first device, transmitting data from the second device to the first device, determining whether the at least first application is registered, determining whether the at least first application is active, granting, based on the determination whether the at least first application is registered and whether the at least first application is active, the at least first application access to the data transmitted from the second device.

15 Claims, 11 Drawing Sheets

SECURING DATA FROM A SHARED DEVICE

CROSS-REFERENCE TO RELATED APPLICATION

This application claims the benefit of U.S. Provisional Application No. 61/061,708, filed Jun. 16, 2008, which is hereby incorporated by reference in its entirety.

BACKGROUND OF THE INVENTION

1. Field of the Invention

The invention relates to securing data obtained from a device where the device is shared among multiple applications.

2. Description of the Related Art

Current multifunction purpose (MFP) devices include the ability for a user to provide data to the MFP via external interfaces such as a Universal Serial Bus (USB) device connected to a USB port on the MFP. For example, a USB smart card reader can be connected to an MFP for authenticating a user using a smart card to enable the user to use the MFP. Or, a USB card reader can be used to obtain a user's credit card information to pay for a print or copy job performed on the MFP. Finally, a USB keyboard could be used to enter user login credentials to the MFP.

In the above-described scenarios, in order to effectively use a USB device connected to an MFP, typically, the USB device is shared among multiple applications running on the MFP. In this scenario, any data that is provided via the USB device, e.g., authentication information, credit card information, etc., can be seen by any application sharing the USB device. For example, if a user swipes a credit card via a USB card reader as payment for a copy job, the credit card information read by the card reader is not only made available to the application that requires the credit card information to complete the transaction, but will also be made available to an application that does not require the credit card information. Thus, sensitive information is distributed to random applications, resulting in a security risk.

Given the above-described scenario of sensitive information being made available to any application that can see it, regardless of whether there is a need for the application to see the data, there is a need for protecting data obtained via an external device from being obtained by unintended applications.

SUMMARY OF THE INVENTION

In light of the above, embodiments of the present invention address the issue by providing a secure method for handling data obtained/received from an external device such that only intended applications are able to obtain/receive the data.

According to an aspect of the present invention, a method for securing the use of data on a first device where the data is sent from a second device, the method including registering at least a first application on the first device, starting the at least first application on the first device, transmitting data from the second device to the first device, determining whether the at least first application is registered, determining whether the at least first application is active, granting, based on the determination whether the at least first application is registered and whether the at least first application is active, the at least first application access to the data transmitted from the second device.

DETAILED DESCRIPTION OF THE EXEMPLARY EMBODIMENTS

The present invention provides a secure method for handling data obtained/received from an external device such that only applications for which the data is intended are able to obtain/receive the data. In order to simplify the following description, reference will be made to a USB card reader as the external device, a card used in conjunction with the USB card reader, and an MFP as the device connected to the external, i.e., USB, device. This should not be seen in anyway to limit the scope of the present invention to these two types of devices or to a USB interface. The present invention is applicable to any type of interface, e.g., IEEE1394 and any devices, e.g., keyboard, printer, etc. that would enable practice of the present invention. In addition, for description purposes only, reference will be made to a multifunction purpose (MFP) apparatus as the device obtaining/receiving the data. This should not be seen in anyway to limit the scope of the present invention to this type of device. The present invention is applicable to any device, e.g., computer, mobile device, etc., that would enable practice of the present invention.

Figure 1:
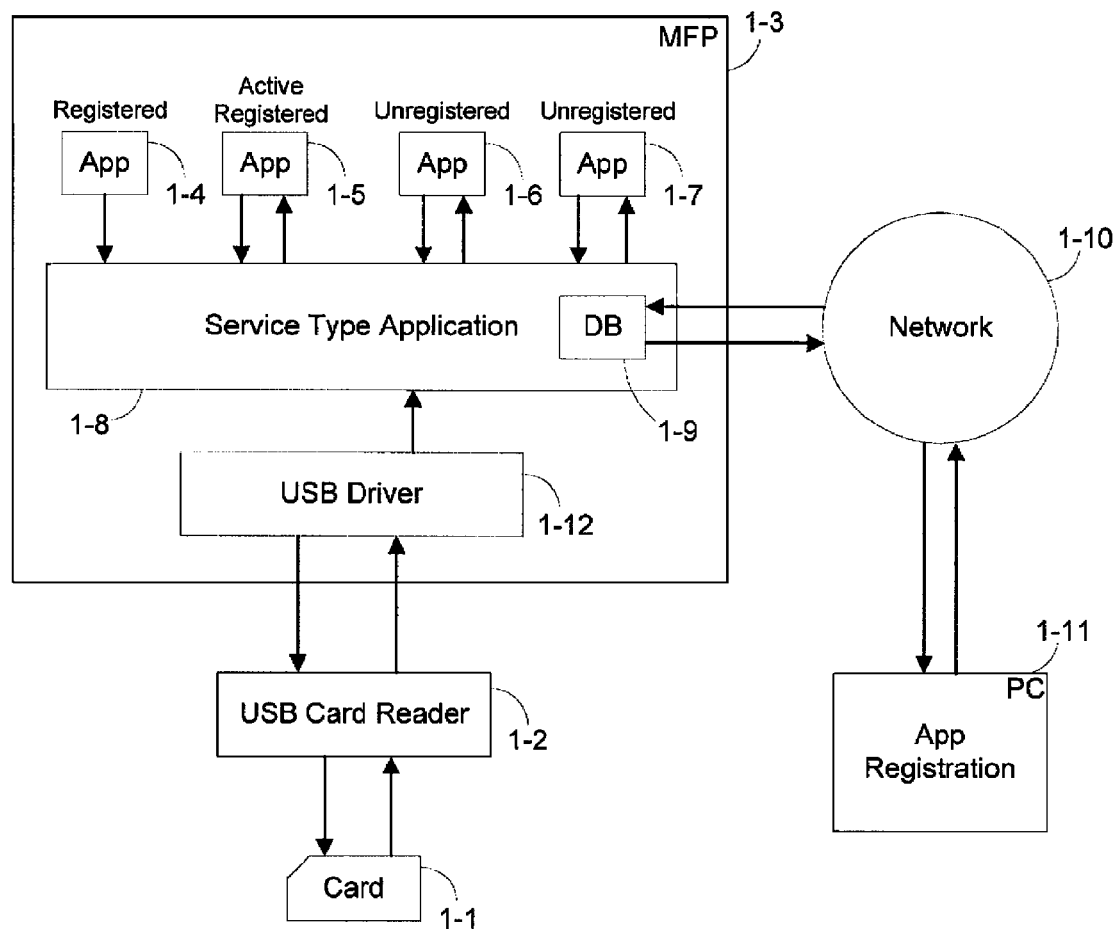
FIG. 1 is a is a representational view depicting a general configuration of the system of the present invention.

FIG. 1 is a representational view depicting a general configuration of the system of the present invention. The system includes card 1-1, USB card reader 1-2, MFP 1-3, Network 1-10, and PC 1-11. USB card reader 1-2 is connected to MFP 1-3 via a USB interface (not shown), while MFP 1-3 is connected to PC 1-11 via Network 1-10. Network 1-10 can be any type of network, including a WAN, LAN, Internet, etc.

MFP 1-3 includes a plurality of applications, 1-4, 1-5, 1-6, and 1-7. In addition, MFP 1-3 also includes a service type application 1-8 and a USB driver 1-12. Service type application includes database 1-9. Card 1-1 includes data to be transferred to one of applications 1-4, 1-5, 1-6, or 1-7 via USB card reader 1-2 and USB driver 1-12.

Figure 2:
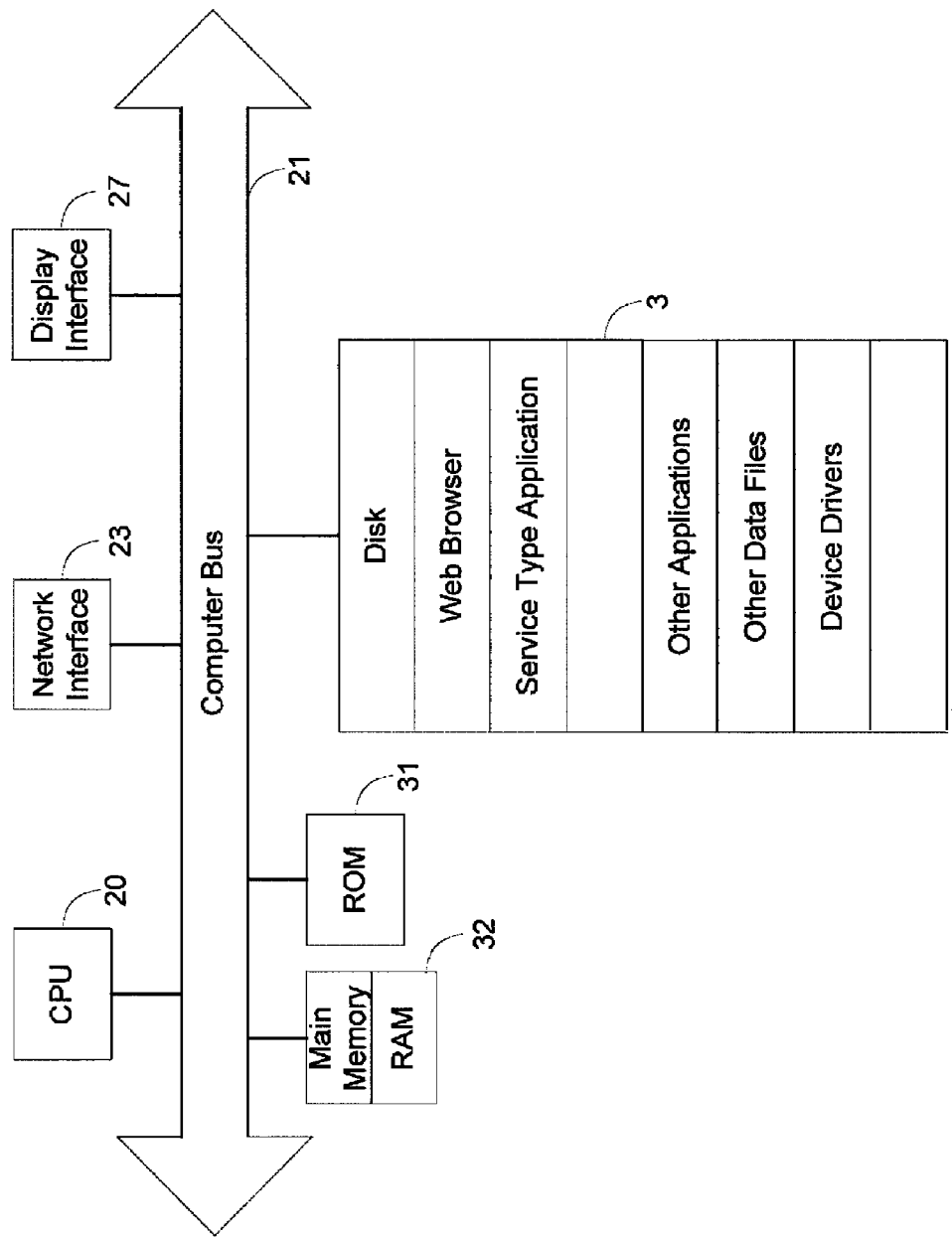
FIG. 2 is a block diagram illustrating the internal architecture of a computer utilizing a service type application of the present invention.

FIG. 2 is a block diagram of an example of the internal architecture of MFP 1-3. Shown in FIG. 2 is CPU 20, network interface 23 to enable communications between the MFP 1-3 and other devices via Network 1-10, and display interface 27 for interfacing with an LCD display (not shown), Read only memory (ROM) 31 stores invariant computer-executable process steps for basic system functions such as basic I/O, start-up, etc. Main random access memory (RAM) 32 provides CPU 20 with memory storage that can be accessed quickly. In this regard, computer-executable process steps of the service type application of the present invention or other applications are transferred from disk 3 over computer bus 21 to RAM 32 and executed therefrom by CPU 20.

Also shown in FIG. 2 is disk 3, which, in addition to the service type application of the present invention, includes an operating system, a web browser executable on the particular operating system, and other applications that enable the MFP 1-3 to provide a multitude of different functions. Disk 3 further includes data files and device drivers. All of the above described components of MFP 1-3 are connected to each other via computer bus 21.

Figure 3:
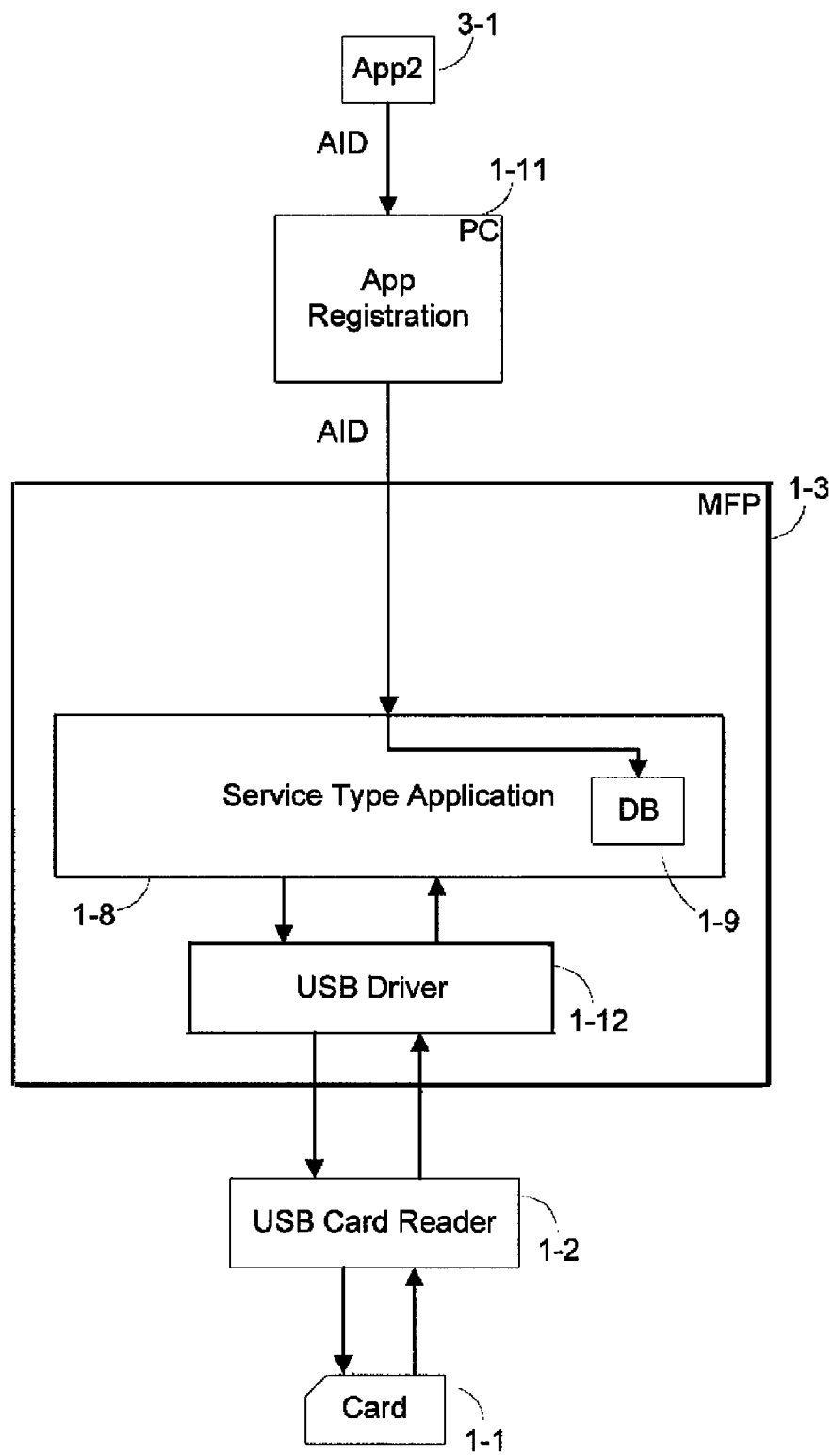
FIG. 3 is a diagram illustrating registering an application according to the present invention.

FIG. 3 is a diagram illustrating registration of an application with the service type application 1-8. In order for an application to be recognized by the service type application 1-8, it must first be registered in database 1-9.

In more detail, an application ID (AID) associated with an application 3-1 is uploaded to database 1-9 via PC 1-11. The AID is a standard alphanumeric value that is commonly used in the industry, and thus, a detailed description is omitted herein. Uploading is performed via a standard Internet browser loaded on PC 1-11 which connects to a web page provided by MFP 1-3. While the present embodiment describes uploading via the Internet, the present invention is not limited to this technique, and any method that would enable remote or local uploading is applicable.

Figure 10:
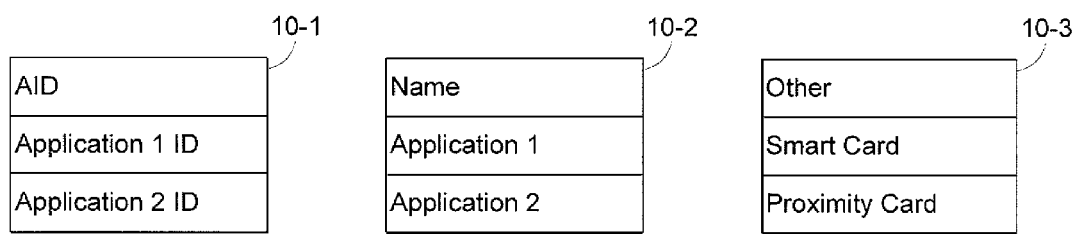
FIG. 10 is a diagram illustrating an example of contents of an application registration database according to the present invention.

FIG. 10 illustrates an example of database 1-9. Field 10-1 contains the AID of application 3-1. Field 10-2 contains the name of application 3-1. Field 10-3 contains other information associated with application 3-1.

Figure 4:
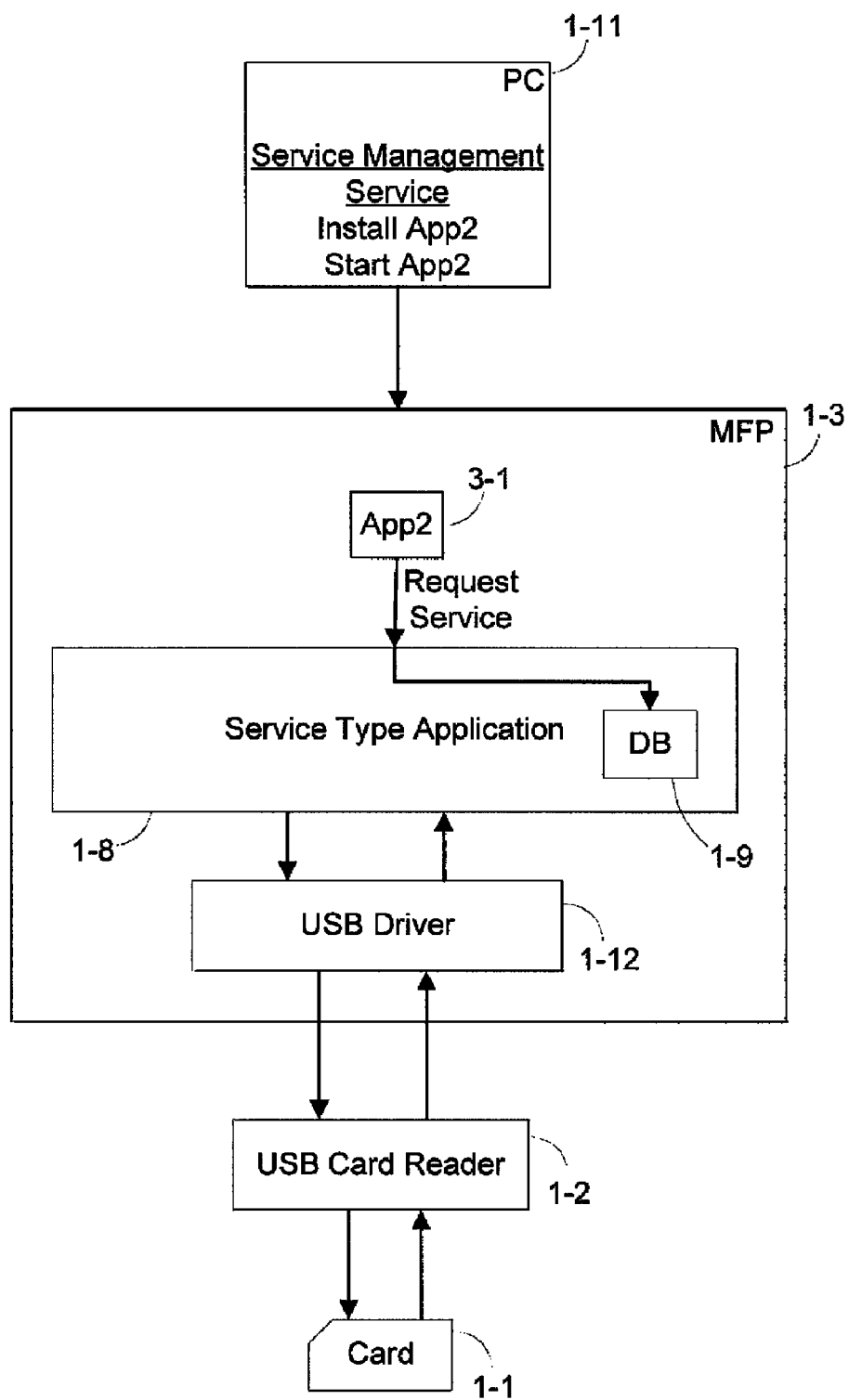
FIG. 4 is a diagram illustrating installation and starting-up an application according to the present invention.

FIG. 4 is a diagram illustrating the installation and start-up of the application registered in FIG. 3. More specifically, application 3-1 is first installed onto MFP 1-3 via PC 1-11 using a standard Service Management Service (SMS). As in the case of registering application 3-1, installation of application 3-1 is accomplished via the standard browser loaded onto PC 1-11 using a website provided by MFP 1-3. Remote installation of applications via SMS is well known, and thus a detailed description is omitted herein. In another embodiment, application 3-1 can be installed locally at MFP 1-3.

Following installation of application 3-1 onto MFP 1-3, application 3-1 is then remotely started via the browser on PC 1-11. When application 3-1 is started, it begins acquiring resources as well as performing other initialization tasks as needed. For example, as part of initializing itself, application 3-1 adds a tab to the screen displayed by an LCD display of MFP 1-3. The tab is used by a user of MFP 1-3 to select application 3-1. Application 3-1 also registers an applet with MFP 1-3, such that the applet appears on the screen of the LCD display of MFP 3-1 when the tab associated with application 3-1 is selected. This applet is used by a user of the MFP 1-3 to interact with application 3-1. In another embodiment, application 3-1 is stated locally at MFP 1-3.

Figure 5:
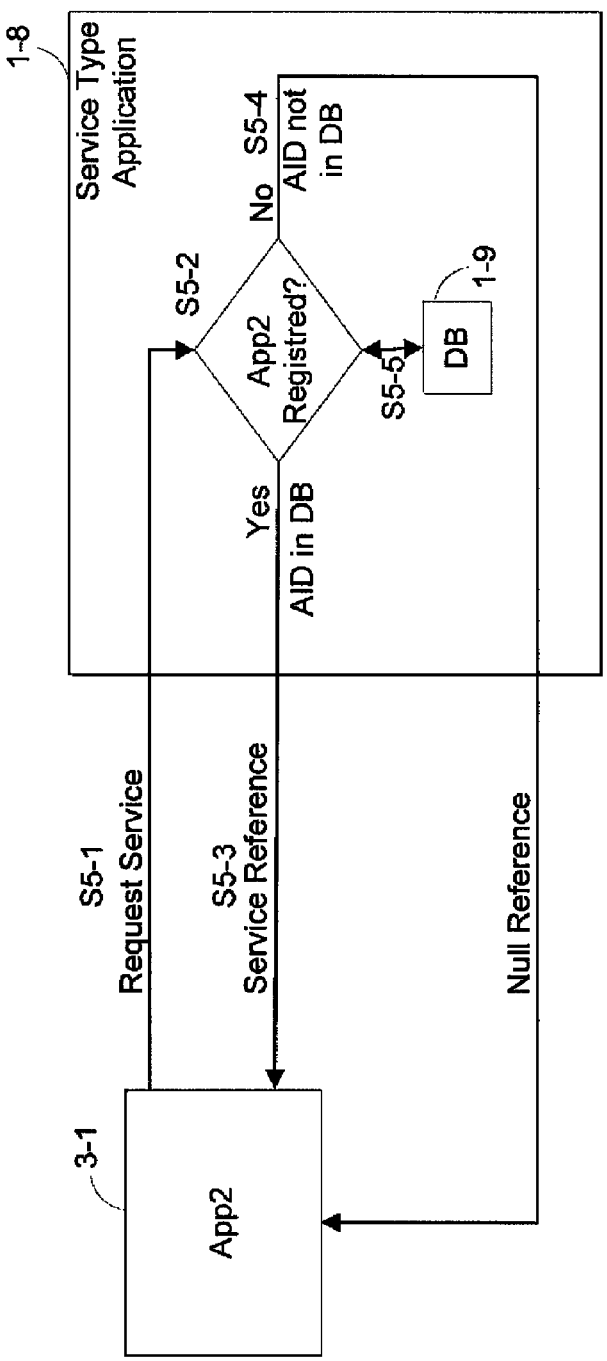
FIG. 5 is a diagram illustrating an application requesting service from the service type application according to the present invention.

FIG. 5 is a diagram illustrating application 3-1 requesting service from the service type application 1-8. Briefly, an application that intends to use the service type application 1-8 must submit a request to the service type application 1-8 to receive a reference from the service type application 1-8.

More specifically, in step S5-1, application 3-1 sends a request for service to the service type application 1-8. In step S5-2, the service type application 1-8 determines whether application 3-1 is registered in database 1-9 by checking database 1-9 in step S5-5. In order for an application to receive a service reference, the application must be registered in database 1-9.

If, in step S5-2, the service type application 1-8 determines that application 3-1 is registered in database 1-9, then in step S5-3, the service type application 1-8 provides a service reference to application 3-1. If, in step S5-2, it is determined that application 3-1 is not registered in database 1-9, then in step S5-4, the service type application 1-8 does not provide a service reference to application 3-1.

Figure 6:
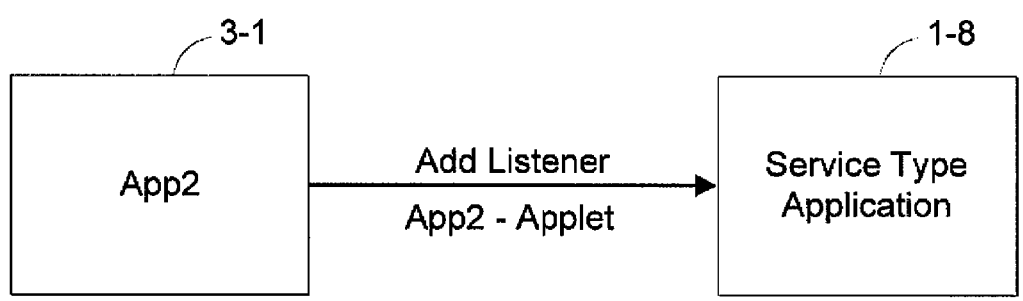
FIG. 6 is a diagram illustrating an application registering itself with the service type application according to the present invention.

FIG. 6 is diagram illustrating an application registering itself as a listener with the service type application 1-8. An application must register itself with the service type application 1-8 in order for the application to be able to listen for information being provided by the service type application 1-8. Registration of applications is a known procedure accomplished through the use of Java® applets, and thus a detailed description is omitted herein.

Figure 7:
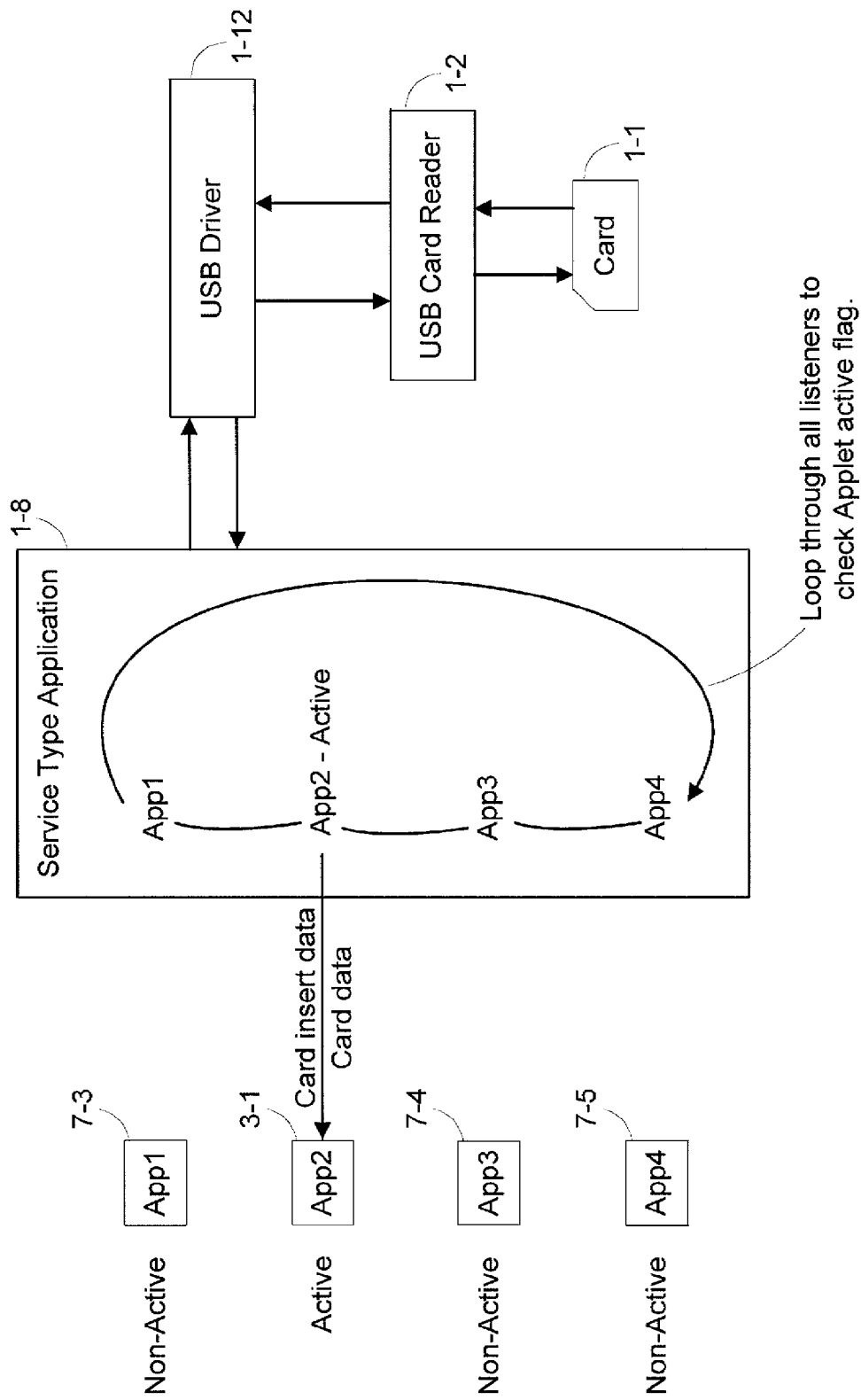
FIG. 7 is a diagram illustrating an active application interfacing with the service type application of the present invention.

FIG. 7 is a diagram illustrating an example of an application interfacing with the service type application 1-8 and receiving data from a card 1-1. Briefly, a card reader connected to MFP 1-3 obtains data from card 1-1, transmits the data to MFP 1-3, and the service type application 1-8 of MFP 1-3 provides the data to a specific application running on the MFP 1-3. In the example illustrated in FIG. 7, card 1-1 is a proximity or magnetic stripe card and the card reader is a USB card reader 1-2. In the case where card 1-1 is a proximity card, card reader 1-2 obtains data from the card 1-1 when the card 1-1 is brought within a predetermined proximity to the USB card reader 1-2. In the case where the card 1-1 is a magnetic stripe card, the USB card reader 1-2 obtains data from the card 1-1 by reading the magnetic stripe on the card 1-1 when the card 1-1 is swiped through a magnetic stripe reader on the USB card reader 1-2.

Figure 11A:
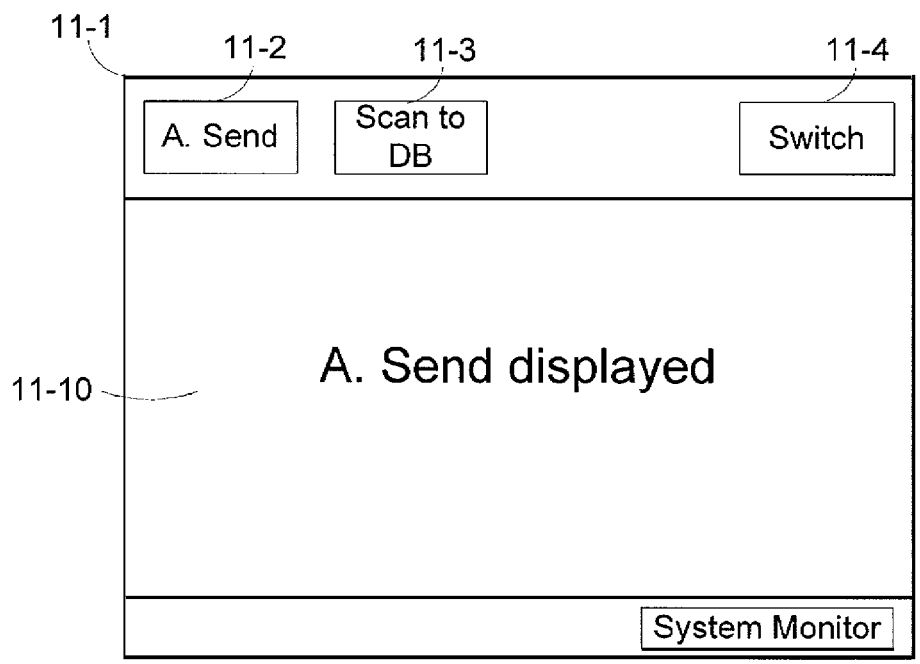
FIG. 11A illustrates a screen of an LCD display according to the present invention.
Figure 11B:
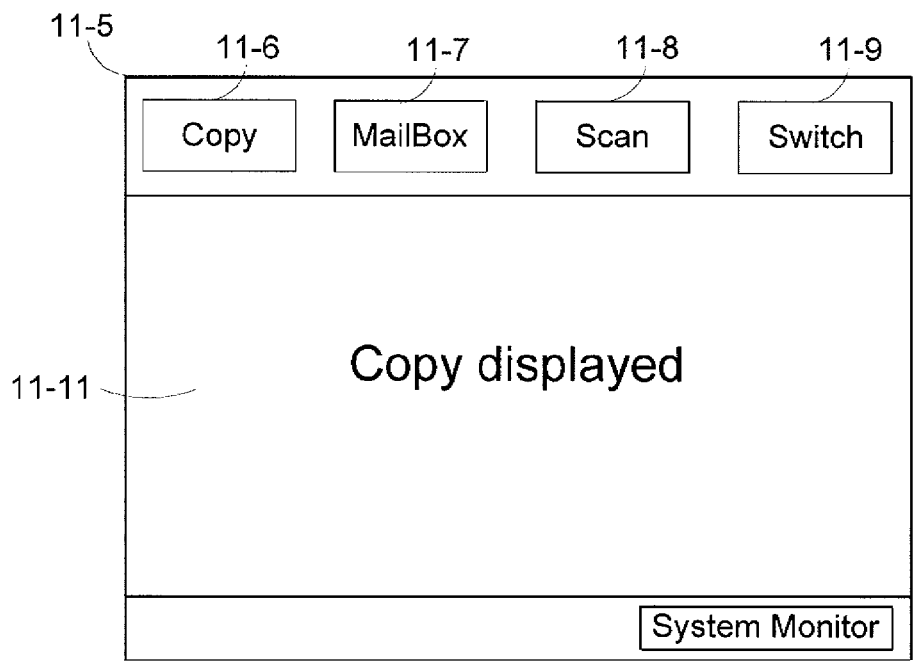
FIG. 11B illustrates a screen of an LCD display according to the present invention.

Applications 7-3, 3-1, 7-4, and 7-5 are all loaded onto MFP 1-3. Only one of these applications can be active at any given time. In one embodiment, an application is determined to be active when the applet associated with the application is displayed on the LCD display of MFP 1-3. FIGS. 11A and 11B illustrate examples of the LCD display.

LCD display 11-1 contains "A. Send" tab 11-2, "Scan to DB" tab 11-3, "Switch" tab 11-4, and display area 11-10. "A. Send" tab 11-2 and "Scan to DB" tab 11-3 are tabs associated with applications that have been loaded onto MFP 1-3 and started as described above. "Switch" tab 11-4 is used to scroll through all available tabs that have been added to LCD Display 11-1. Upon selection of a particular application, in the case of LCD display 11-1, "A. Send", the applet associated with this application is displayed in display area 11-10. In order to display the applet associated with the "Scan to DB" application, "Scan to DB" tab 11-3 would be selected.

LCD Display 11-5 contains "Copy" tab 11-6, "MailBox" tab 11-7, "Scan" tab 11-8, "Switch" tab 11-9, and display area 11-11. Selection of an application and displaying of the selected applications corresponding applet are the same in LCD Display 11-5 as for LCD Display 11-1.

Returning to FIG. 7, service type application 1-8 detects that a particular application is active based on the applet that is currently being displayed in, for example, display area 11-10 of LCD display 11-1. In the example illustrated in FIG. 7, the active application is determined to be application 3-1.

The service type application 1-8 determines the active status of an application by checking an applet active flag associated with each application that has previously registered as a listener with the service type application 1-8. When the active flag is set "on", this indicates that the application is active. When the service type application 1-8 determines that a particular application's active flag is set to "on", the service type application 1-8 provides a card insert event and the data obtained from the card to the application in question. Since no other application's active flag is set, these applications are considered to be non-active, and thus, none of these applications see the card insert event and associated data.

In another embodiment in which only one application is loaded onto MFP 1-3, the applet for that application would be displayed in, for example, display area 11-10, by default.

Figure 8:
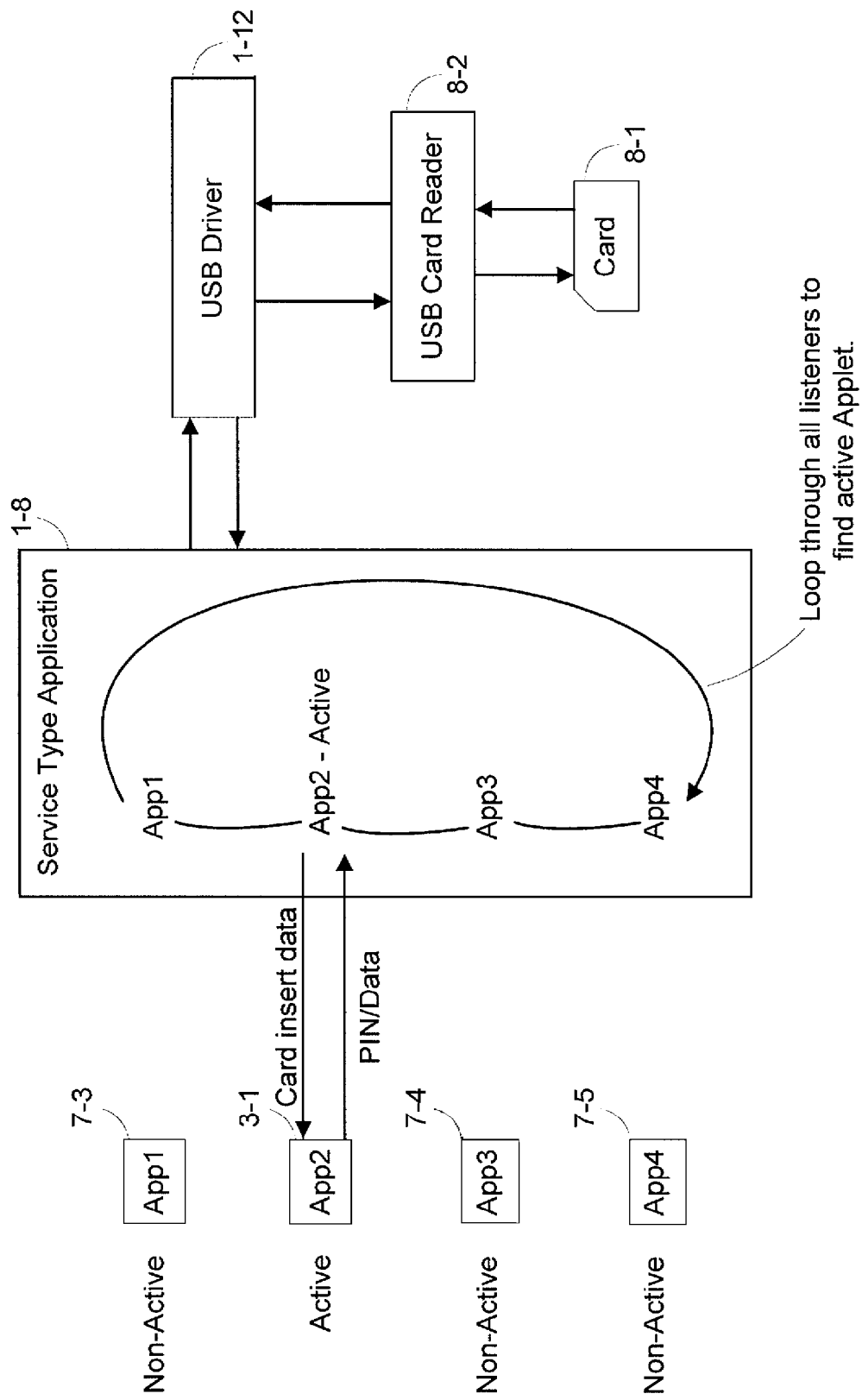
FIG. 8 a diagram illustrating an active application interfacing with the service type application of the present invention.

FIG. 8 is a diagram illustrating an example of an application interfacing with the service type application 1-8 and receiving data from a card, where the card is a smart card 8-1 and USB card reader 8-2 is a smart card reader. The overall functionality provided in FIG. 8 is essentially the same as that provided in FIG. 7. The difference in functionality provided in FIG. 8 is due to the card being a smart card 8-1.

Turning to FIG. 8, after smart card 8-1 is read by USB card reader 8-2, the data read by USB card reader 8-2 is transmitted to service type application 1-8. Service type application 1-8 then provides a card insert event to application 3-1, which has been determined by service type application 1-8 to be the active application, as described above. Upon receipt of the card insert event, application 3-1 typically prompts a user of MFP 1-3 to enter a PIN via the LCD display of MFP 1-3 (not shown). Application 3-1 then provides the PIN to service type application service 1-8. In addition, application 3-1 typically also provides service type application 1-8 with data created by/associated with the application 3-1. For example, user credential information entered by a user and captured by application 3-1.

Figure 9:
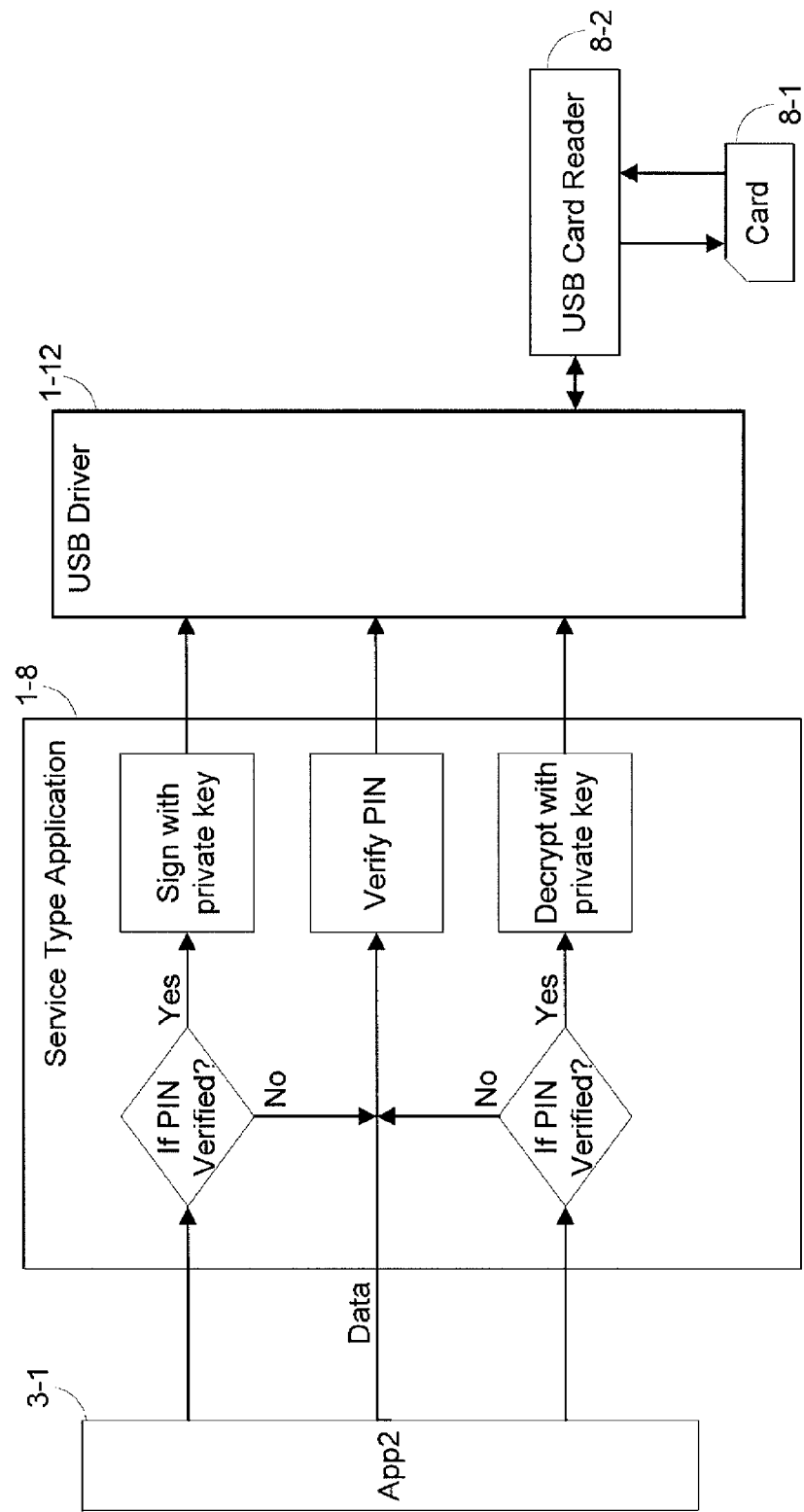
FIG. 9 is a diagram illustrating of an application accessing smart card services according to the present invention.

FIG. 9 illustrates an example of smart card related functions supported by service type application 1-8. More specifically, it depicts examples of how service type application 1-8 makes use of the PIN provided in FIG. 8. The functions include, but are not limited, verifying the smart card's PIN 9-4, signing data utilizing a private key on the smart card 9-3, and decrypting data utilizing a private key on the smart card 9-5.

If it is determined in 9-1 that the PIN was verified in 9-4, then in 9-3, the data provided by application 3-1 is signed with a private key stored in the smart card 8-1. This is done to obtain a digital signature in order to authenticate the data. If it is determined in 9-2 that the PIN was verified in 9-4, then in 9-5, any encrypted data (encrypted using a public key) that was provided by application 3-1 is decrypted using a private key stored in the smart card 8-1. The encryption and decryption of the data is done for data confidentially purposes.

It is to be understood that the above described features can be achieved by a method in which a storage medium is supplied to a system or device, the storage medium having computer-executable process steps for realizing the above described functions, and a computer (CPU or MPU) for the system or device that reads the computer-executable process steps stored in the storage medium and executes them.

In this case, the computer-executable process steps read from the storage medium executes the functions of the above described embodiments. Thus, the computer-executable process steps or the storage medium storing the computer-executable process steps therein constitute the present invention.

As a storage medium for supplying the computer-executable process steps, for example, a floppy disk, a hard disk, an optical disk, a magneto-optical disk, a CD-ROM, a CD-R, a magnetic tape, a non-volatile memory card, a ROM, any other applicable storage medium can be employed.

When the computer-executable process steps read by the computer are executed, not only are the above described functions of the embodiments realized, but also an operating system working on the computer may carry out part or all of the actual processing that realizes the functions of the above described embodiments.

The computer-executable process steps read from the storage medium may be written to a memory provided on a function-extension board inserted into the computer, of a function-extension unit connected to the computer, and a CPU provided on the function-extension board or unit carries out part of all of the actual processing that realizes the functions of the above described embodiments.

While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A method comprising:
   receiving, at a first device, identification information associated with an application;
   storing the identification information in a database;
   in response to a service request from the application, determining, at the first device, that the application is registered on the first device based on the identification information in the database, wherein the application is one of a plurality of applications on the first device;
   receiving, at the first device, data from a second device;
   in response to the receiving the data from the second device, determining, at the first device, whether the application is active on the first device based on information indicating whether an applet of the application is displayed on a display of the first device, wherein the applet is one of a plurality of applets configured to be displayed on the display, wherein each of the applets is associated with a respective one of the plurality of applications, and wherein no more than one of the plurality of applets can be displayed on the display at a given time; and
   in response to determining that the application is active on the first device, granting the application access to the data received from the second device.

2. The method of claim 1, further comprising:
   in response to the determining that the application is registered on the first device, determining, at the first device, to provide the requested service for the application, wherein the requested service for the application includes the determining whether the application is active on the first device;
   in response to a service request from a second application, determining, at the first device, that the second application is not registered on the first device, wherein the second application is one of the plurality of applications on the first device; and
   in response to the determining that the second application is not registered on the first device, determining, at the first device, to not provide the requested service for the second application.

3. The method of claim 1, wherein the determining whether the application is active on the first device comprises checking a flag associated with the application.

4. The method of claim 1, further comprising:
   in response to a service request from a second application, determining, at the first device, that the second application is registered on the first device, wherein the second application is one of the plurality of applications on the first device;

in response to the receiving the data from the second device, determining, at the first device, that the second application is not active on the first device based on information indicating that an applet of the second application is not displayed on the display of the first device, wherein the applet of the second application is one of the plurality of applets; and in response to the determining that the second application is not active on the first device, determining to not grant the second application access to the data received from the second device, wherein the determining that the application is active on the first device is based on information indicating that the applet of the application is displayed on the display of the first device.

5. The method of claim 1, wherein the second device is operable to read data from a storage medium external to the second device and transmit the read data to the first device, the second device external to the first device.

6. The method of claim 1, wherein the data comprises authentication information.

7. The method of claim 1, wherein the data comprises credit card information.

8. A device comprising:
one or more processors; and
memory coupled to the one or more processors and operable for storing instructions which, when executed by the one or more processors, cause the one or more processors to perform operations comprising:
receiving, at a first device, identification information associated with an application;
storing the identification information in a database;
in response to a service request from the application, determining, at the first device, that the application is registered on the first device based on the identification information in the database, wherein the application is one of a plurality of applications on the first device;
receiving, at the first device, data from a second device;
in response to the receiving the data from the second device, determining, at the first device, whether the application is active on the first device based on information indicating whether an applet of the application is displayed on a display of the first device, wherein the applet is one of a plurality of applets configured to be displayed on the display, wherein each of the applets is associated with a respective one of the plurality of applications, and wherein no more than one of the plurality of applets can be displayed on the display at a given time; and
in response to determining that the application is active on the first device, granting the application access to the data received from the second device.

9. A non-transitory computer-readable storage medium storing instructions which, when executed by one or more processors, cause the one or more processors to perform operations comprising:
receiving, at a first device, identification information associated with an application;
storing the identification information in a database;
in response to a service request from the application, determining, at the first device, that the application is registered on the first device based on the identification information in the database, wherein the application is one of a plurality of applications on the first device;

receiving, at the first device, data from a second device;

in response to the receiving the data from the second device, determining, at the first device, whether the application is active on the first device based on information indicating whether an applet of the application is displayed on a display of the first device, wherein the applet is one of a plurality of applets configured to be displayed on the display, wherein each of the applets is associated with a respective one of the plurality of applications, and wherein no more than one of the plurality of applets can be displayed on the display at a given time; and in response to determining that the application is active on the first device, granting the application access to the data received from the second device.

10. The non-transitory computer-readable storage medium of claim 9, the operations further comprising:

in response to the determining that the application is registered on the first device, determining, at the first device, to provide the requested service for the application, wherein the requested service for the application includes the determining whether the application is active on the first device;

in response to a service request from a second application, determining, at the first device, that the second application is not registered on the first device, wherein the second application is one of the plurality of applications on the first device; and in response to the determining that the second application is not registered on the first device, determining, at the first device, to not provide the requested service for the second application.

11. The non-transitory computer-readable storage medium of claim 9, wherein the determining whether the application is active on the first device comprises checking a flag associated with the application.

12. The non-transitory computer-readable storage medium of claim 9, the operations further comprising:

in response to a service request from a second application, determining, at the first device, that the second application is registered on the first device, wherein the second application is one of the plurality of applications on the first device;

in response to the receiving the data from the second device, determining, at the first device, that the second application is not active on the first device based on information indicating that an applet of the second application is not displayed on the display of the first device, wherein the applet of the second application is one of the plurality of applets; and in response to the determining that the second application is not active on the first device, determining to not grant the second application access to the data received from the second device, wherein the determining that the application is active on the first device is based on information indicating that the applet of the application is displayed on the display of the first device.

13. The non-transitory computer-readable storage medium of claim 9, wherein the second device is operable to read data from a storage medium external to the second device and transmit the read data to the first device, the second device external to the first device.

14. The non-transitory computer-readable storage medium of claim 9, wherein the data comprises authentication information.

15. The non-transitory computer-readable storage medium of claim 9, wherein the data comprises credit card information.

* * * * *